(12) United States Patent
Kulkarni et al.

(10) Patent No.: US 12,386,968 B2
(45) Date of Patent: Aug. 12, 2025

(54) QUANTIFIED SOCIAL MEDIA PRIVACY

(71) Applicant: McAfee, LLC, San Jose, CA (US)

(72) Inventors: Dattatraya Kulkarni, Bangalore (IN); Urmil Mahendra Parikh, Bangalore (IN); Jitesh Dattani, Bangalore (IN); Himanshu Srivastava, Bangalore (IN)

(73) Assignee: McAfee, LLC, San Jose, CA (US)

( * ) Notice: Subject to any disclaimer, the term of this patent is extended or adjusted under 35 U.S.C. 154(b) by 300 days.

(21) Appl. No.: 17/511,219

(22) Filed: Oct. 26, 2021

(65) Prior Publication Data
US 2023/0020523 A1 Jan. 19, 2023

(30) Foreign Application Priority Data
Jul. 7, 2021 (IN) .............................. 202141030486

(51) Int. Cl.
*G06F 21/57* (2013.01)
*G06F 21/60* (2013.01)

(52) U.S. Cl.
CPC ............ *G06F 21/577* (2013.01); *G06F 21/60* (2013.01)

(58) Field of Classification Search
CPC ..... G06F 21/577; G06F 21/60; G06F 21/6218
See application file for complete search history.

(56) References Cited

U.S. PATENT DOCUMENTS

| | | | |
|---|---|---|---|
| 6,272,467 B1 * | 8/2001 | Durand .................. | G06Q 10/02 705/26.1 |
| 8,925,099 B1 * | 12/2014 | Saxe .................... | G06F 21/6245 713/187 |
| 2007/0145348 A1 * | 6/2007 | Ichimura ................ | B82Y 10/00 257/9 |
| 2013/0088224 A1 * | 4/2013 | Koizumi ................ | B82Y 10/00 324/300 |
| 2014/0237610 A1 | 8/2014 | Vandervort | |
| 2015/0039409 A1 * | 2/2015 | Marsico ............. | G06Q 30/0217 705/14.1 |
| 2019/0349350 A1 * | 11/2019 | Valites .................... | H04L 63/20 |
| 2020/0184080 A1 * | 6/2020 | Trim ....................... | G06F 21/84 |
| 2021/0081189 A1 * | 3/2021 | Nucci ................... | G06F 16/252 |

OTHER PUBLICATIONS

EP22203384.7 Extended European Search Report from the European Patent Office dated Mar. 13, 2023 (8 pages).
Liu et al., "A Framework for Computing the Privacy Scores of Users in Online Social Networks," ACM Transactions on Knowledge Discovery from Data (TKDD), Association for Computing Machinery, Inc. US, vol. 5, No. 1, Dec. 1, 2010 (Dec. 1, 2010), pp. 1-30, XP058320539, ISSN: 1556-4681, DOI:10.1145/1870096.1870102.

* cited by examiner

*Primary Examiner* — Meng Li
(74) *Attorney, Agent, or Firm* — Patent Capital Group

(57) ABSTRACT

A computing includes a hardware platform having a processor and a memory; and instructions encoded within the memory to instruct the processor to: on behalf of a human user, scan a social media platform for which the user has an account, and compute a proactive privacy risk score, wherein the proactive privacy risk score is a quantitative value based at least in part on an inherent risk of the social media platform according to data types that may be collected and exposed by the social media platform, and at least in part on privacy settings for the social media platform in relation to the data types; and recommend or initiate an action to improve the proactive privacy risk score.

20 Claims, 9 Drawing Sheets

QUANTIFIED SOCIAL MEDIA PRIVACY

CROSS REFERENCE TO RELATED APPLICATIONS

This application claims the benefit of priority to Indian Patent Application Serial No. 202141030486, filed Jul. 7, 2021, entitled "MECHANISM TO QUANTIFY AND MEASURE PRIVACY EXPOSURE OF SOCIAL MEDIA PLATFORMS," the entire contents of which are hereby incorporated by reference in their entirety.

FIELD OF THE SPECIFICATION

This application relates in general to computer security, and more particularly though not exclusively to a system and method for quantifying social media privacy.

BACKGROUND

Social media facilitates the sharing of ideas, thoughts, and information. Social media users build virtual networks of fiends, associates, acquaintances, and followers, and share various information of different types. It is estimated that approximately 4 billion people across the world use social media.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
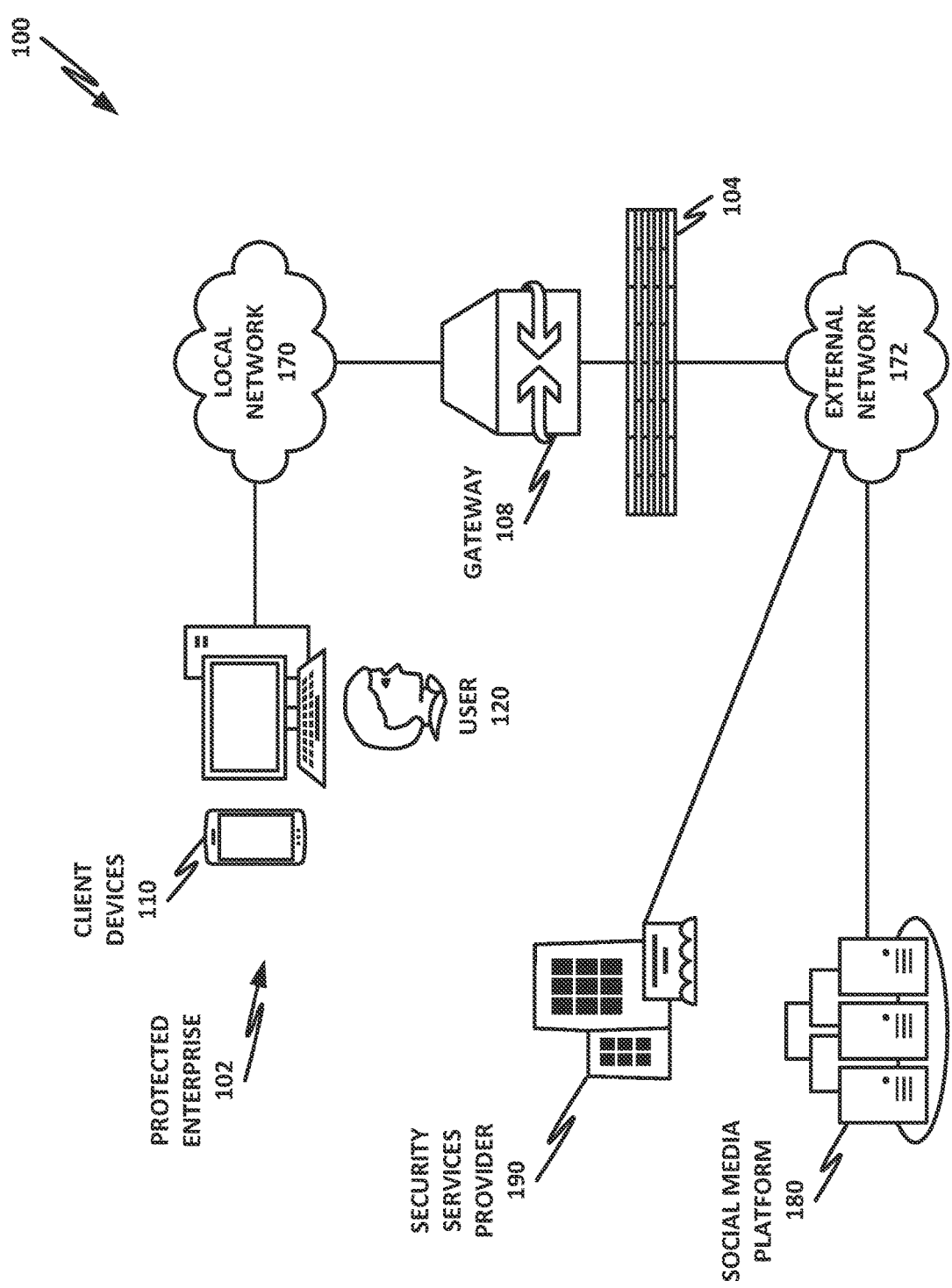
FIG. 1 is a block diagram of selected elements of a security ecosystem.

A computing includes a hardware platform having a processor and a memory; and instructions encoded within the memory to instruct the processor to: on behalf of a human user, scan a social media platform for which the user has an account, and compute a proactive privacy risk score, wherein the proactive privacy risk score is a quantitative value based at least in part on an inherent risk of the social media platform according to data types that may be collected and exposed by the social media platform, and at least in part on privacy settings for the social media platform in relation to the data types; and recommend or initiate an action to improve the proactive privacy risk score.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Social media is a useful technology that facilitates sharing of ideas, thoughts, and information. Users of social media may build virtual networks and communities with whom they want to share information. Social media may also enable users to share information to a global or unrestricted audience. For example, some social media posts may be shared or may be kept completely private. Others may be shared only with friends. Yet others may be shared with friends and friends of friends. And, finally, some may be publicly shared. Currently, literally billions of people use social media. While these social media connections may be useful and beneficial for the users, they can also leave users vulnerable in several ways. In particular, users may be concerned about security, validity, identity theft, and privacy. Social media users concerned have increased in recent years. There have been numerous incidents of well-publicized data breaches, which alarmed users and forced them to rethink some of their social media relationships. Users may also be concerned about the security and/or privacy of their personal information. Regarding legitimacy and relevancy, there have been well-publicized incidents of "fake news," in which malicious actors attempt to influence users with news stories that are false but that support a particular partisan narrative. Indeed, there have been credible allegations that social media influence may have swayed one or both of the 2016 and 2020 United States presidential elections. While it is not possible to determine what the results of these elections would have been absent social media influences, the perception that social media is tampering with the democratic process can itself be problematic.

Social media is also a serious attack vector for social engineering attacks for phishing or scamming. Malicious actors may use social media connections to try to collect personal information about users and to compromise their identities, steal their identities, or scam them out of money.

Despite these high-profile breaches and serious concerns, users continue to use social media. They may continue to use social media because the services have become a part of their everyday lives. Today's users may be more aware of privacy concerns in light of media coverage and education. But even if they are more wary going forward, the amount of data they have already shared (either knowingly or unknowingly) may be beyond their personal comprehension.

The ubiquity of social media, and its utility in connecting with friends and networks of people, means that, despite the concerns, users are likely to continue using social media. Thus, it is beneficial to provide users with the ability to evaluate the privacy posture of the various social media platforms that they interact with. For example, a straightforward and easily understood quantitative privacy and/or security metric can help a user easily grasp how much information he has exposed on social media and what data he has made available on social media platforms. This metric can help the user reduce his privacy exposure and be more aware while interacting with social media platforms. This quantification can help to increase the user's digital hygiene and help the user to identify areas where he can improve his social media privacy and/or security posture.

In general usage, privacy may be understood to be an abstract topic with various inconsistent definitions. This can make detection and correction of privacy concerns more difficult. It is difficult to control something that cannot be measured. Thus, the present specification provides a system and method that quantitatively analyzes the privacy implications of social media platforms. Once social media privacy/security is measurable, it is also actionable. Embodiments of the present specification also provide recommended remedial actions once a user has quantified his social media exposure.

This can help a user to optimize his social media usage and his privacy considerations. A social media privacy score brings objectivity and measurability to a process of navigating complex settings pages, unknown terminology, and unrecognized dangers. In the past, users have had to search and experiment with different approaches to try to protect and control their privacy. Indeed, at least some social media platforms may lack motivation to simplify a user's ability to control data security and privacy. This is because the social media platforms may derive profit from user data that they have access to. It may therefore be contrary to their financial interests to make it too easy for users to limit the amount of data shared with the social media platform.

Embodiments of the specification identify data that can be exposed by a social media platform, either directly or indirectly through derivation. The data may be mapped to security settings provided by the respective social media platforms, and a quantitative score can be assigned to the particular platform and to the user's operation of the platform.

A privacy score can be derived for various datatypes, based on factors like the breadth of the audience, the potential impact of a leak or misuse, the ease of exploitation, available protection measures, or similar. These scores may be contextual, personalized, and pertinent. A quantitative privacy score can be used to baseline, benchmark, and/or compare privacy management actions and solutions. Furthermore, the presence or absence of settings for controlling and limiting the exposure of certain datatypes can contribute to the quantitative score.

In some cases, the quantitative score may have sufficient resolution to provide the user with a useful metric along one or multiple dimensions. For example, a unitary privacy score may be provided with substantially 100 quanta of resolution. Stated otherwise, this score may be a value between 0 and 1 with two decimal places or may be presented as a corresponding percentage score between 0 and 100 percent. This provides at least 100 quantitative values in the spread of possible values. In general, a quantitative analysis may provide more information than analyses that score on metrics with less resolution. For example, a five-star metric has only five quanta of resolution. Similarly, a letter grade may provide only five quanta of resolution. Thus, embodiments of the present specification may provide a numerical score for privacy that has six or more quanta of resolution. In other embodiments, a quantitative score may have 10 or more, 20 or more, 25 or more, 30 or more, 50 or more, 75 or more, 100 or more, or 1000 or more quanta of resolution. One benefit of a percentage (or alternatively, a decimal value between 0 and 1 with two decimal places) is that 100 quanta of resolution is small enough of a number set for a human user to generally grasp but large enough to provide fine-grained control.

This quantification of privacy exposure enables the gamification of privacy management with discrete actions and result loops. The present specification provides a simplified and engaging alternative to control privacy exposure. It also improves the privacy posture of a user in a meaningful and explainable way.

The present specification provides quantification of privacy on factors like reach, relevance, and risk. One approach is to assign relative scores to privacy settings and actions. This accounts for the relative importance and urgency in configuring these settings.

The present specification also provides a mechanism to compute aggregate privacy exposure scores based on the contribution of privacy factors in a particular social media network.

The present specification also provides a mechanism for scanning a user's data on a social network to identify the risk of exposure.

The present specification also provides for the quantification of privacy postures with controls provided to improve the posture. This may be done in a way that is backed with data and formulas instead of simply an empirical or heuristic approach.

This provides advantages over systems that provide only qualitative privacy assessments. Instead of a mere qualitative assessment, the present specification provides a quantification of security and privacy settings of social media networks with respect to reach, relevance, and risk, by way of illustrative and nonlimiting example. The relative security and privacy impact between different settings can be quantified with objective data, which is beneficial relative to privacy management techniques that require a long laundry list of settings. Furthermore, some social media platforms make it difficult to find settings that can be used to control Social networks and social media platforms like Facebook, Instagram, Twitter, Snapchat, Pinterest, and TikTok are essentially big data platforms. To these platforms, data are especially important because their monetization engines are data driven. For the most part, these platforms do not themselves generate data or content, and they do not directly own the data or content. Rather, it is the users using the platform who generate and legally own the data. However, these social media platforms have user privacy agreements full of dense legalese that gives them certain rights in the user data, and in particular, that makes it possible for them to monetize those data.

According to recent data, an average internet user spends approximately two hours a day interacting with social media platforms. Some users may spend much more than that. This interaction can vary from new content creation to content sharing, to simply content viewing.

Any of these interactions—even just small interactions like scrolling through a newsfeed—can generate significant data on the social media platform. For example, simply browsing a newsfeed can generate data because the social media platform may track how fast the user browses and which content the user pauses at. The platform can also track the user's likes, dislikes, friends lists, associations, groups, and posts. Natural language processing, facial recognition, image analysis, artificial intelligence, and many other data mining techniques can be used to glean information about the user from the user's operation of the social media platform. The platform can then use these data to profile the user, determine her likes or dislikes, her associations, her purchasing habits, her political beliefs, and similar. For example, simply the amount of time a user spends looking at an image may be used to glean information about her and her preferences.

Thus, if an average user is spending at least two hours a day on social media platforms, the volume of data she is leaving behind as her digital exhaust can become truly massive. Each datum may not be significant individually, but once the data are compiled, corroborated, correlated, and processed, these little bits of information can lead to highly accurate and definitive profiles of users. These can be used to target ad campaigns, sell data, or for nefarious purposes such as modulating political views or identity theft. Furthermore, even if the profile of a user is not correct, the assumption that it is correct may be used to profile the user. Thus, assumptions about a user may become inputs to a social credit system and can affect the user's real life even if the assumptions are not correct.

Unfortunately, users are often unaware of the extent or the context of what they have shared on the social media platforms. They may have no idea of the impact these platforms can have on their privacy or their reputation. User interaction with social media platforms has increased to such an extent that it has become a part of their daily routine. These users may have no idea of their privacy exposure, whether direct or derived. Furthermore, because they forget their past activity on social media networks, they may leave a significant digital exhaust. This digital exhaust may lead to huge chunks of data being present on a platform, which can then be aggregated to profile the user. This can be used to derive information such as age, sex, sexual orientation, gender identity, political preferences, other demographics, product preferences, political agendas, and similar. Some countries have explicit social credit systems, and thus a user's digital exhaust can have a substantial impact on the user's daily life. Even without an official social credit system, a user's digital exhaust may affect the user's reputation in the community. The insights that can be derived or assumed from the user's digital exhaust can go so deep that it can become a very scary problem for the user—if she is even aware of it.

The present specification provides a straightforward metric that a user can understand and can use to increase her privacy and decrease her exposure on a social media platform. This metric may help the user to understand how much exposure she has already experienced of her privacy or security information and can help her to make adjustments on a given social media platform so that she can increase her security and privacy posture.

The foregoing can be used to build or embody several example implementations, according to the teachings of the present specification. Some example implementations are included here as nonlimiting illustrations of these teachings.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computing apparatus. The computing apparatus also includes a hardware platform may include a processor and a memory. The apparatus also includes instructions encoded within the memory to instruct the processor to: on behalf of a human user, scan a social media platform for which the user has an account, and compute a proactive privacy risk score, where the proactive privacy risk score is a quantitative value based at least in part on an inherent risk of the social media platform according to data types that may be collected and exposed by the social media platform, and at least in part on privacy settings for the social media platform in relation to the data types; and recommend or initiate an action to improve the proactive privacy risk score. Other embodiments of this aspect include corresponding computer systems, apparatus, and computer programs recorded on one or more computer storage devices, each configured to perform the actions of the methods.

Implementations may include one or more of the following features. The computing apparatus where the proactive privacy risk score is a weighted average of risk assessments for the data types. The instruction are further to compute a quantitative reactive privacy risk score, where the reactive privacy risk score accounts for data instances of the data types that the user has already provided to the social media platform. The reactive privacy risk score may include a weighted average of data instances. The reactive privacy risk score further accounts for an extent of exposure for the data instances. The instructions are further to classify the data types into a plurality of data classes, where the data classes represent privacy levels of the data classes. The data classes include a class for private by nature, a class for private by choice, a class for public by choice, and a class for public by nature. The instructions are further to assign weights to the data classes, and weight the data types according to weights of their associated data classes. The instructions are to weight the data types according to size and/or scope of audience for the data types. The privacy settings include settings for whether data types are private to the user, may be shared with a subset of users of the social media platform, may be viewed by all users of the social media platform, or are publicly searchable by search engines. The proactive privacy risk score is independent of whether the user has provided any data instances of the data types. The instructions are to assign weights to data types according to whether options associated with the data types are enabled or disabled. The instructions are to add a penalty weight to at least some data types for which an opt out is not available. The quantitative value has a resolution of at least six quantum values. The quantitative value has a resolution of at least 100 quantum values. Implementations of the described techniques may include hardware, a method or process, or computer software on a computer-accessible medium.

Other embodiments of this aspect include corresponding computer systems, apparatus, and computer programs recorded on one or more computer storage devices, each configured to perform the actions of the methods.

One general aspect includes one or more tangible. The nontransitory computer-readable storage media also includes analyze a user's use of a social media platform, and assign to the user a proactive privacy risk score and reactive privacy risk score. The media also includes where the proactive privacy risk score is calculated as a product of impact of exposure of a plurality of data types that may be shared by the social media platform, and risk of exposure of the data types, and where the reactive risk score is calculated as a product of impact of exposure of a plurality of data instances that the user has shared via the social media platform, and risk of exposure of the data instances. The media also includes recommend or initiate an action to improve at least one of the proactive privacy risk score and reactive privacy risk score. Other embodiments of this aspect include corresponding computer systems, apparatus, and computer programs recorded on one or more computer storage devices, each configured to perform the actions of the methods.

Implementations may include one or more of the following features. The one or more tangible, nontransitory computer-readable media where the proactive privacy risk score and reactive privacy risk score are quantitative scores. The quantitative score has a resolution of at least six quantum values. The instruction are further to compute a quantitative reactive privacy risk score, where the reactive privacy risk score accounts for data instances of the data types that the user has already provided to the social media platform. The reactive privacy risk score may include a weighted average of data instances. The reactive privacy risk score further accounts for extent of exposure for the data instances. The extent of exposure includes whether the data instances are private to the user, shared with friends, shared with friends and friends of friends, shared with the full social media platform, or publicly searchable by search engines. The quantitative score has a resolution of at least 100 quantum values. The data classes include a class for private by nature, a class for private by choice, a class for public by choice, and a class for public by nature. The instructions are further to assign weights to the data classes, and weight the data types according to weights of their associated data classes. The proactive privacy risk score is a weighted average of risk assessments for the data types. The instructions are further to classify the data types into a plurality of data classes, where the data classes represent privacy levels of the data classes. The instructions are to weight the data types according to size and/or scope of audience for the data types. The privacy settings include settings for whether data types are private to the user, may be shared with a subset of users of the social media platform, may be viewed by all users of the social media platform, or are publicly searchable by search engines. The proactive privacy risk score is independent of whether the user has provided any data instances of the data types. The instructions are to assign weights to data types according to whether options associated with the data types are enabled or disabled. The instructions are to add a penalty weight to at least some data types for which an opt out is not available. Implementations of the described techniques may include hardware, a method or process, or computer software on a computer-accessible medium.

One general aspect includes a computer-implemented method. The computer-implemented method also includes computing a quantitative proactive privacy risk score for a user's operation of a social media platform, where the proactive privacy risk score accounts for impact of exposure and risk of exposure for a plurality of data types, and further accounts for user options associated with the plurality of data types. The method also includes computing a quantitative reactive privacy risk score for the user's operation of the social media platform, where the reactive privacy risk score accounts for impact of exposure and risk of exposure for a plurality of data instances the user has shared via the social media platform, and further accounts for user options associated with the plurality of data instances. The method also includes based at least in part on the proactive privacy risk score and reactive privacy risk score, recommending or initiating an action for the user to increase his or her privacy posture relative to the social media platform. Other embodiments of this aspect include corresponding computer systems, apparatus, and computer programs recorded on one or more computer storage devices, each configured to perform the actions of the methods.

Implementations may include one or more of the following features. The method may include manually curating the user options associated with the plurality of data types or plurality of data instances. An apparatus may include means for performing the method. The means for performing the method may include a processor and a memory. The memory may include machine-readable instructions that, when executed, cause the apparatus to perform the method. The apparatus is a computing system. At least one computer-readable medium may include instructions that, when executed, implement a method or realize an apparatus. The method may include crowd sourcing the user options associated with the plurality of data types or plurality of data instances. The method may include web crawling the user options associated with the plurality of data types or plurality of data instances The proactive privacy risk score and reactive privacy risk score are quantitative scores. The proactive privacy risk score is a weighted average of risk assessments for the data types. The data classes represent privacy levels of the data classes. The data classes include a class for private by nature, a class for private by choice, a class for public by choice, and a class for public by nature. The method may include assigning weights to the data classes, and weight the data types according to weights of their associated data classes. The method may include weighting the data types according to size and/or scope of audience for the data types. The user options include options for whether data types are private to the user, may be shared with a subset of users of the social media platform, may be viewed by all users of the social media platform, or are publicly searchable by search engines. The proactive privacy risk score is independent of whether the user has provided any data instances of the data types. The method may include assigning weights to data types according to whether options associated with the data types are enabled or disabled. The method may include adding a penalty weight to at least some data types for which an opt out is not available. The quantitative value has a resolution of at least six quantum values. The quantitative value has a resolution of at least 100 quantum values. Implementations of the described techniques may include hardware, a method or process, or computer software on a computer-accessible medium.

Other embodiments of this aspect include corresponding computer systems, apparatus, and computer programs recorded on one or more computer storage devices, each configured to perform the actions of the methods.

Implementations may include one or more of the following features. The method where the reactive privacy risk score may include a weighted average of data instances. The reactive privacy risk score further accounts for extent of exposure for the data instances. The extent of exposure includes whether the data instances are private to the user, shared with friends, shared with friends and friends of friends, shared with the full social media platform, or publicly searchable by search engines. Implementations of the described techniques may include hardware, a method or process, or computer software on a computer-accessible medium.

A system and method for providing quantified social media privacy will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In the example of FIG. 1, security ecosystem 100 may be an enterprise, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Security ecosystem 100 may include one or more protected enterprises 102. A single protected enterprise 102 is illustrated here for simplicity, and could be a business enterprise, a government entity, a family, a nonprofit organization, a church, or any other organization that may subscribe to security services provided, for example, by security services provider 190.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 could be a simple home router, or could be a sophisticated enterprise infrastructure including routers, gateways, firewalls, security services, deep packet inspection, web servers, or other services.

In further embodiments, gateway 108 may be a stand-alone internet appliance. Such embodiments are popular in cases in which ecosystem 100 includes a home or small business. In other cases, gateway 108 may run as a virtual machine or in another virtualized manner. In larger enterprises that features service function chaining (SFC) or NFV, gateway 108 may be include one or more service functions and/or virtualized network functions.

Local network 170 may communicate across local boundary 104 with external network 172. Local boundary 104 may represent a physical, logical, or other boundary. External network 172 may include, for example, websites, servers, network protocols, and other network-based services. In one example, a social media platform 180 may connect to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

Protected enterprise 102 may contract with or subscribe to a security services provider 190, which may provide security services, updates, antivirus definitions, patches, products, and services. MCAFEE, LLC is a nonlimiting example of such a security services provider that offers comprehensive security and antivirus solutions.

Users 120 of protected enterprise 102 may have security, privacy, data integrity, or other concerns related to their interaction with social media platform 180. Thus, security services provider 190 may provide cloud-based services, or localized services on devices 110 that help to quantify data risks related to the user of social media platform 180, as described in this specification.

Figure 2:
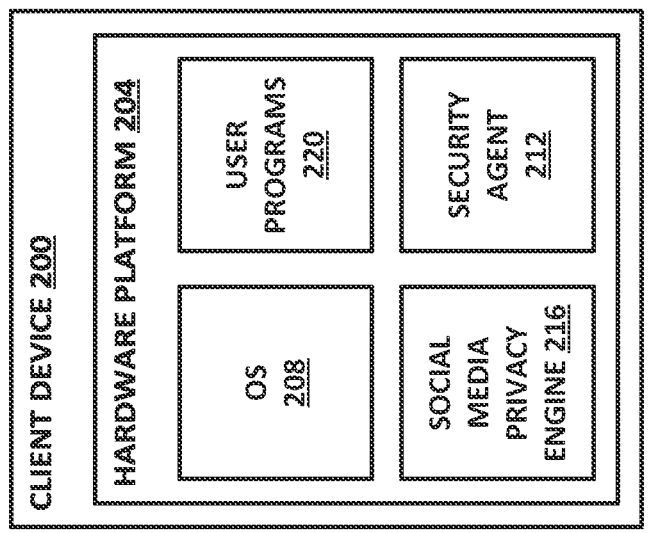
FIG. 2 is a block diagram of a client device.

FIG. 2 is a block diagram of a client device 200. Client device 200 may be any device that may be operated by an end-user, such as a laptop, desktop, smartphone, tablet, convertible computer, smartwatch, or similar. The most common use case is that client device 200 is a standalone device on its own hardware platform 204. However, in some contexts—and particularly in the enterprise context—a client device 200 could also be a virtual machine, such as a virtual desktop.

Figure 7:
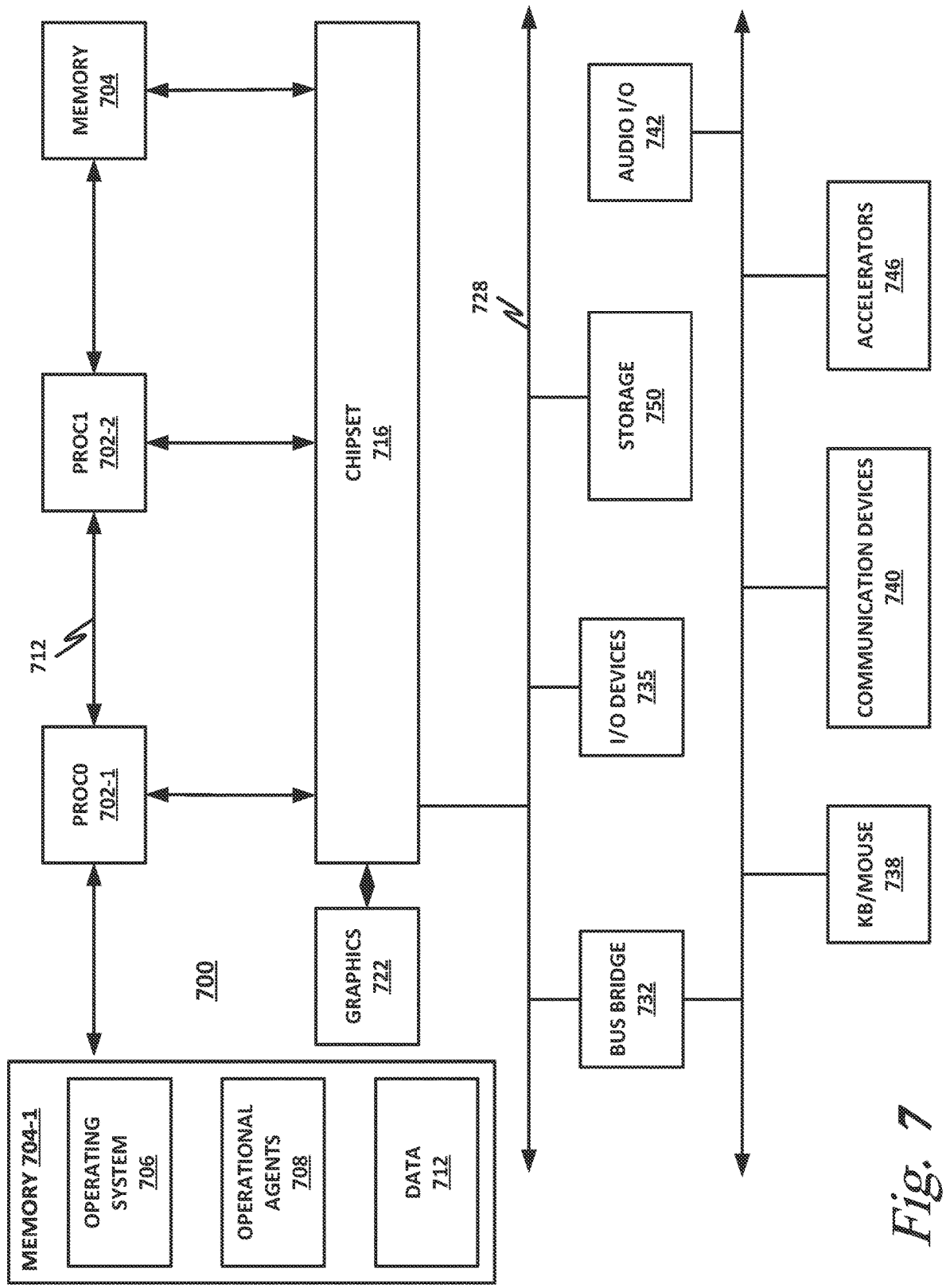
FIG. 7 is a block diagram of selected elements of a hardware platform.
Figure 8:
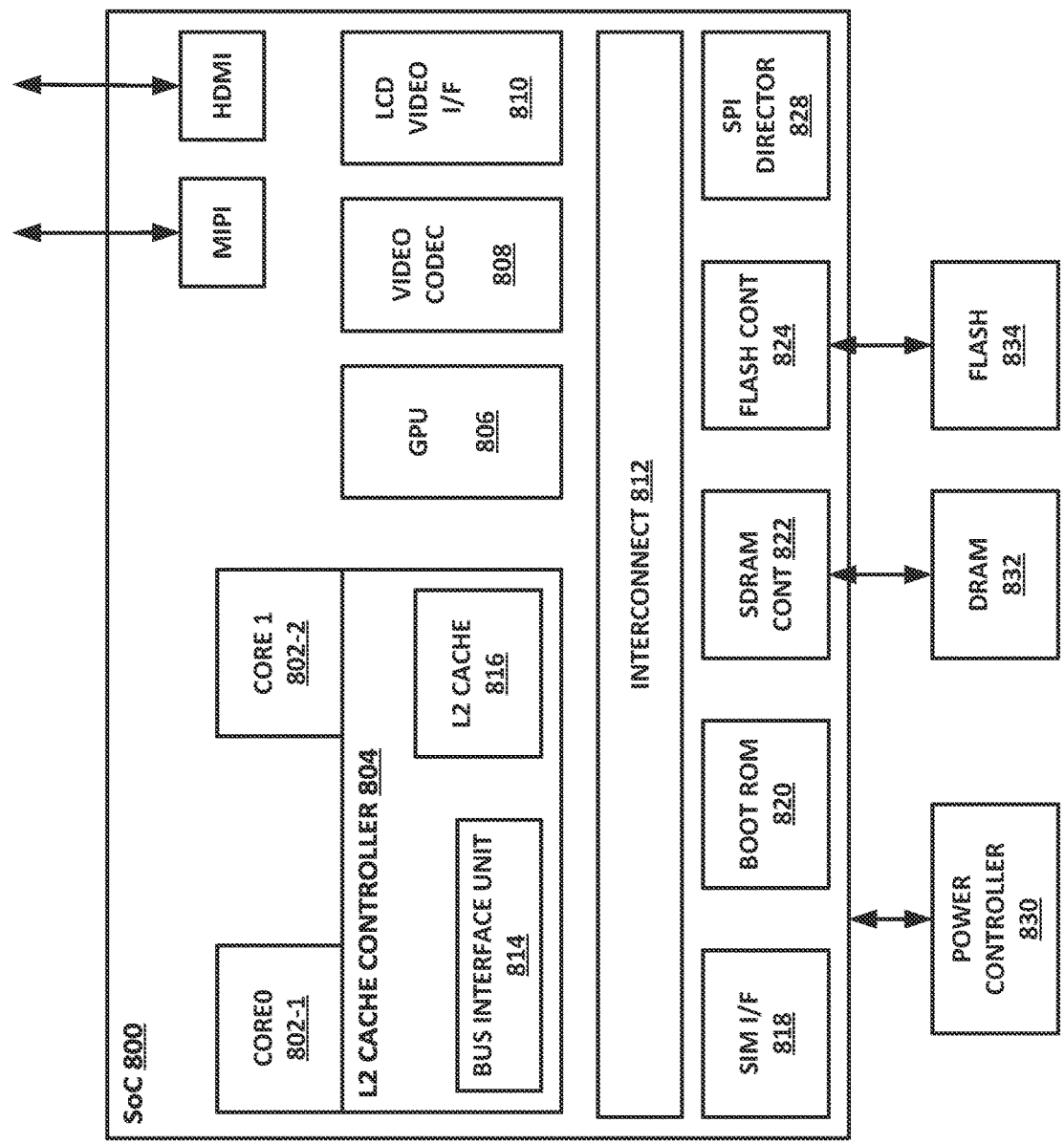
FIG. 8 is a block diagram of selected elements of a system-on-a-chip (SoC).

Client device 200 includes a hardware platform 204. Illustrative examples of hardware platforms are shown in FIGS. 7 and 8 below.

Hardware platform 204 may host an operating system 208. Operating system 208 may run various programs including user programs 220. User programs 220 could include a web browser, which end-users could use to access certain social media platforms. User programs 220 could also include dedicated apps for accessing specific social media platforms.

A security agent 212 may provide security services such as antivirus, anti-malware, anti-adware, or other security and privacy services. A social media privacy engine 216 may be part of security agent 212 or may run as a standalone application.

Social media privacy engine 216 may be configured to quantify a user's social media privacy settings and to advise the user of potential actions to improve his or her security posture. In some cases, social media privacy engine 216 may perform the computations locally to score or to quantify privacy considerations. In other embodiments, the division of labor may be split between a local client device and a cloud service. In those cases, social media privacy engine 216 may collect certain local information, such as identifying, via user programs 220, which social media platforms the user has installed. This could include, for example, polling the operating system to determine if there standalone or dedicated applications for certain mobile or certain social media to determine if there are certain dedicated social media apps installed on the operating system. This could also include a plug-in or extension to a web browser that determines which social media sites the user visits. Furthermore, with the user's permission, social media privacy engine 216 may also receive the user's credentials to enable social media privacy engine 216 (or an associated cloud service) to scan certain social media settings on the user's behalf.

Figure 3:
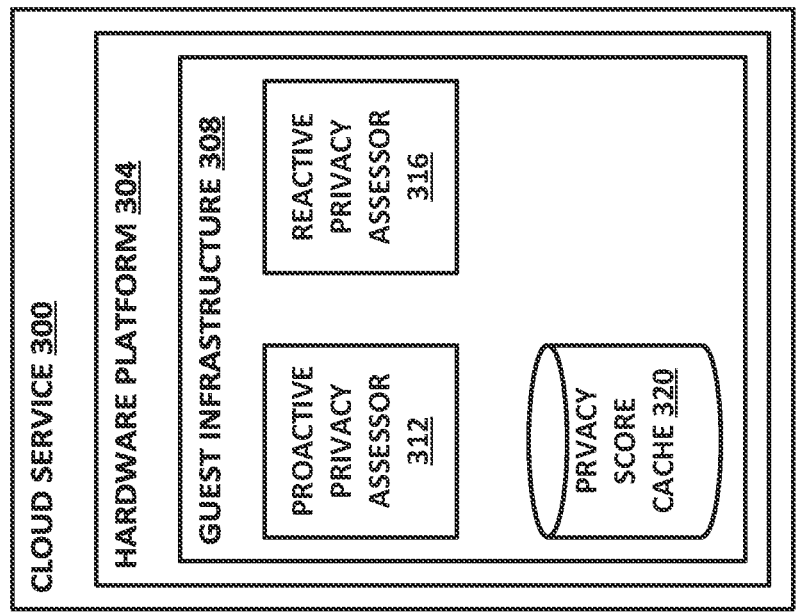
FIG. 3 is a block diagram of a cloud service.
Figure 9:
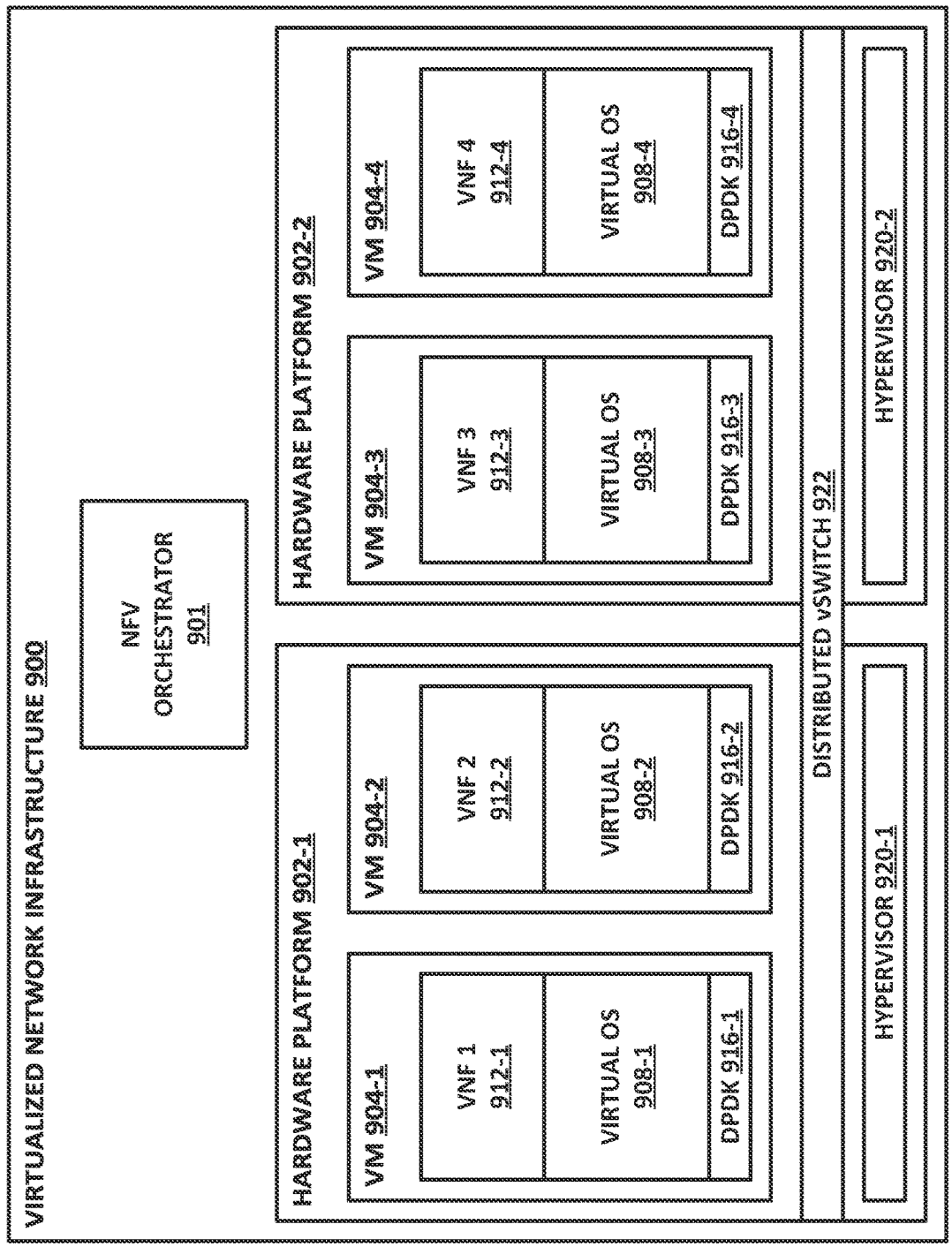
FIG. 9 is a block diagram of selected elements of a network function virtualization (NFV) infrastructure.
Figure 10:
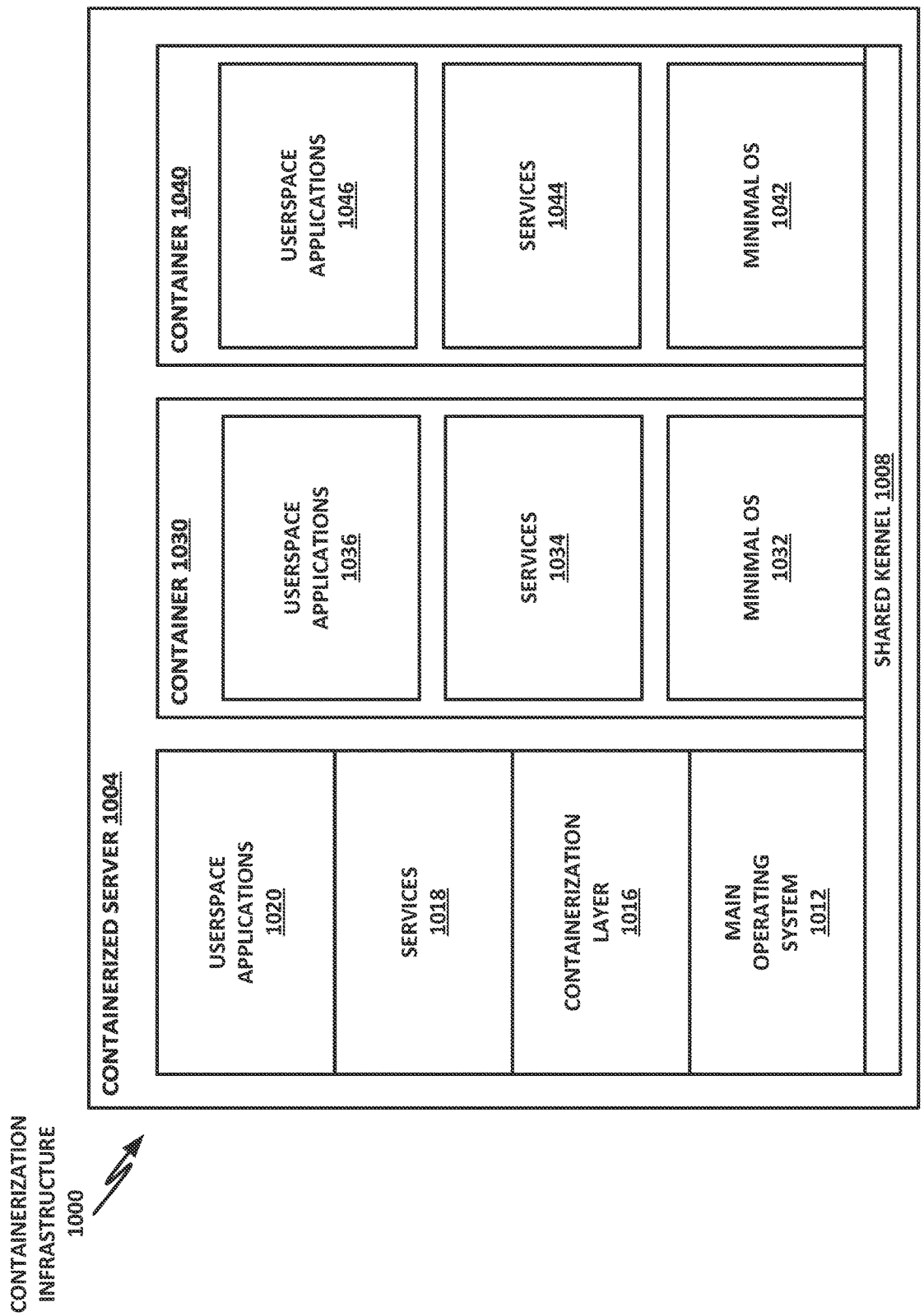
FIG. 10 is a block diagram of selected elements of a containerization infrastructure.

FIG. 3 is a block diagram of selected elements of a cloud service 300. Cloud service 300 may be provided to supplement or replace some or all of the functions of social media privacy engine 216 of FIG. 2. In this example, cloud service 300 runs on a hardware platform 304, which provides a guest infrastructure 308. In the case of a cloud service, it is common (but not required) to host different services as separate virtual machines, virtual network functions, containers, and/or micro services. Examples of virtualization and containerization infrastructure are illustrated in FIGS. 9 and 10 below.

In this case, guest infrastructure 308 includes a privacy store cache 320, which may contain stored information about known privacy scores. This could include information about known social media platforms, including their settings and privacy implications, as well as user scores. Privacy score cache 320 could also include trained machine learning (ML) models or other information, such as heuristic information, that can be used in the scoring process.

The quantitative privacy scoring of the present specification may, in some examples, be divided two separate modules or phases. This includes a proactive privacy assessor 312 and a reactive privacy assessor 316. By way of illustrative example, proactive privacy assessor 312 may be concerned with the risk of future privacy exposure that a user may be exposed to. This may be based on the user's social media services and settings. Proactive privacy assessor 312 is not necessarily concerned with present-state media exposure (e.g., based on specific data instances that the user has shared) but rather is concerned with the privacy infrastructure of the user's social media platforms, including the user's settings on those platforms.

Reactive privacy assessor 316 may be concerned with exposure that the user may have already encountered. This may include, for example, searching for exposure by scanning the user's historical data on social media platforms and examining specific data instances and, where appropriate, their affiliated privacy settings. Reactive privacy assessor 316 is thus able to assess a present-state or past privacy posture and help to the user to improve that privacy posture.

Figure 4:
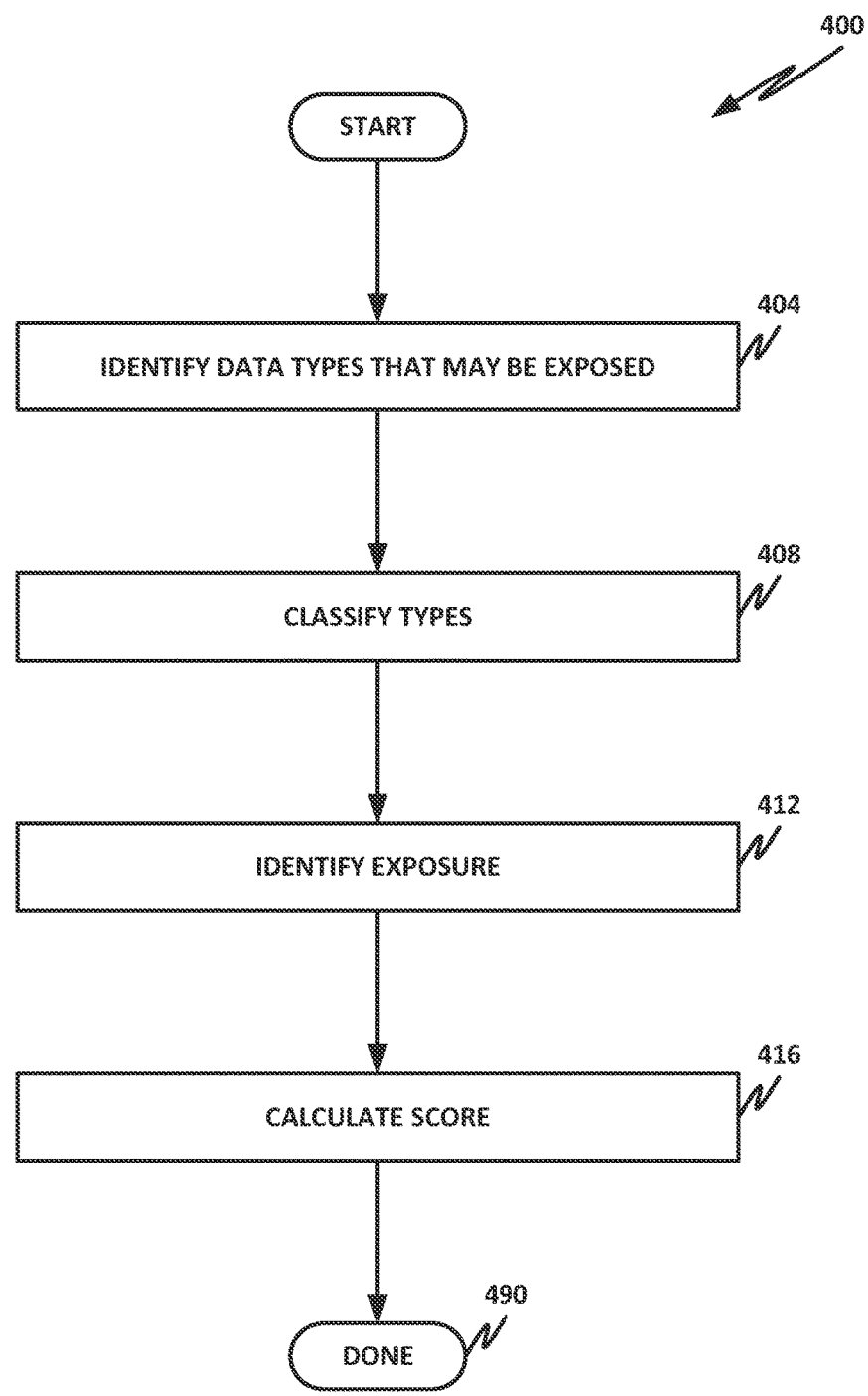
FIG. 4 is a flow chart of a method of performing proactive privacy assessment.

FIG. 4 is a flowchart of a method 400 of performing proactive privacy assessment.

Proactive privacy assessment may include a calculation of privacy risk that the user faces based on how a social platform manages its user's content. For example, a photo that a user (in the generic sense) uploads to the platform may have certain associated privacy settings that the user can select. This may include sharing with a limited group, such as friends, a wider set of users, such as friends of friends, public exposure to the world, or keeping the photographs strictly private to the user. The available privacy and security settings play a role in how the user's data may be exposed or shared with other users or third parties.

Most social media platforms provide some settings to protect the user's privacy. In some cases, these may be driven by government regulation or industry standards. However, in some cases, these settings are buried deep in nested pages that are hard to access and that the user rarely sees. Thus, the users may rarely configure them. For example, a recent survey has found that approximately 80 percent of social media platform users never configure their privacy settings. These users instead rely on the default settings provided by the social media platform. In many cases, these default settings are focused on what will most benefit the social media platform rather than what will be best for the users. These platforms may monetize the user's data, and the virality of the user's data can actually help with the monetization. Thus, these platforms may be motivated to provide the users with the minimum default privacy necessary to meet regulations and/or industry standards. In some cases, the quantitative assessment provided herein may be used to guide and ease the user's access to privacy settings and to help the user configure those privacy settings.

A proactive privacy assessor module of the present specification may be agnostic of the user's actual content shared. For example, the proactive privacy assessor is concerned with the platform's policy for sharing photographs (or other content) and the user's current settings and how it affects the privacy. It is not necessarily concerned with the specific photographs the user has shared or whether those photographs have individual overrides on the default privacy settings.

Deducing proactive privacy exposure can be done by identifying data types that can be shared by a given social media platform and identifying the exposure of these datatypes by finding user settings on that social media platform and determining how those settings may affect user privacy.

Within this specification, there is a distinction between data classes, datatypes, and data instances. Data classes may be considered broad categories of data and may be used to classify different datatypes. Datatypes may refer to the different fields or types of data that a user may share. These could include information fields, such as name, address, phone number, Social Security number, employment history, educational history, or other data fields. Datatypes may also include certain types of content that may be uploaded, such as photographs, drawings, memes, videos, or other content. Individual instances of a datatype may be referred to as data instances. For example, photographs may refer to a datatype, and an individual photograph may be an instance of that datatype.

In block 404, the system identifies datatypes that may be exposed by a particular social media platform. For example, datatypes may include information about the user, comments, posts, photos, likes, dislikes, email address, work location, job history, education history, political views, or other datatypes. Any datatype that may be exposed by the social media platform can be enumerated.

Different embodiments may use different mechanisms to collect data elements relevant to specific platforms. For example, in some cases, manual curation may be used to carefully observe the features provided by particular social media platform. Alternatively, an automation crawler could be used to crawl web forms to identify the data shared by a social media platform. This can crawl over the various social media pages and identify available fields. Alternatively, information about a social media platform could also be crowdsourced or gathered over time.

In block 408, each data type that may be shared by a social media platform may be classified, such as by assigning it to one of several categories.

| Info Type | Nature | Example types of data elements exposed by the platform | Intrinsic privacy value (indicative) |
|---|---|---|---|
| Class I | Private by Nature | Personally-identifying information (PII), SSN, Maiden name, driver's license, income, userid/passwords | 100 |
| Class II | Private by Choice | Address, phone number, workplace, geotags | 70 |
| Class III | Public by Choice | Selected photos, shared posts, location check-in, blogs | 50 |
| Class IV | Public/Don't care | Anonymous data collection, comments, likes | 10 |

In this example, four classes are provided. It should also be noted that multinominal classification may be used in some instances. For example, a photograph or a post may not have a fixed category or a fixed class in the abstract. Some photographs or posts are more sensitive than others. Thus, while some datatypes can be confidently assigned to one class or another, it is also possible that some datatypes can appear in more than one class, with the understanding that individual data instances may have different classifications from one another.

Based on the classification, each datatype may be provided a weight as illustrated in the table above. The weight represents the quantitative criticality of the data element and the relative risk it can impart to user's privacy. Note that the numbers provided here are an illustrative and nonlimiting example only, and other intrinsic privacy values or weights may be provided in different embodiments.

When providing a quantitative proactive privacy assessment to the user, the privacy score for each datatype may be considered, regardless of whether the user has provided any data instances of that type. Proactive assessment may calculate future risk of using the social media platform based on the privacy configuration. Because the user could, in the future, provide a data instance of a type the user has not yet provided, it is advantageous for the proactive privacy assessment to include all of the available datatypes, regardless of whether the user has yet used them. Thus, the proactive assessment takes into consideration all of the datatypes that the platform makes available. This is under the assumption that if the user someday provides an instance of that data, it might impact her privacy.

Numerically, if N is the number of data elements used by social media platform, then the weighted score for each data element may be represented as $WD_1$–$WD_n$.

In block 412, the system may identify the exposure of each datatype. This may include using the settings provided by the social media platform. This operation may include mapping the various datatypes to their associated privacy settings. Note that this may not be a one-to-one mapping. This can be a many-to-many mapping because some settings may affect various datatypes and some datatypes may be affected by more than one setting.

In this case, the exposure can account for the user's current settings. The settings give the exposure of the respective data elements that they are associated with and may include the range of audience that the data may be exposed to. For example, exposure limits may include:

a. Private;

b. Only selected members of the platform;

c. Everyone in the platform;

d. Beyond the platform—data searchable through outside search engines.

In this example, the higher the exposure, the higher the weight of exposure for that data element. Depending on the configuration options available for the settings, weights may be assigned to each option depending on the extent of exposure the configuration allows. For example, one embodiment may use the following:

Public: weight (10);

Friends of friends: weight (4);

Friends: weight (3);

Friends except: weight (2);

Specific friends: weight (2);

Custom: weight (2);

Only me: weight (0).

In an example, settings that have associated enable/disable options may also be weighted accordingly. For example, if enabled, the weight is 0; if disabled, the weight is 10. Alternatively, for different options, when enabled, the weight is 10; when disabled, the weight is 0. Other values can be assigned depending on the feature and the effect of enabling or disabling the feature.

The system may gather the settings and map them to datatypes as described above. This can be manually curated, can be done via automation, can be crowdsourced, or done some other way.

In one illustrative example, if an option or a datatype does not include an opt out, the weight for the option may be doubled to amplify the impact. For example, if the user cannot opt out of sharing certain data, the impact of that lack of options is increased by doubling the weight.

The specific configurations for the individual user settings may be extracted by using techniques like web scraping or similar. Some platforms also publish documented or undocumented APIs that can be leveraged to identify the user's platform settings and configurations. In some cases, accessing the user settings may require access to the user's account. If account access is required, then the user may elect to share his credentials with the cloud service so that processing can be done on the cloud or processing can be done locally where the user is already log in. For example, the web scraping could be performed locally with the user logged in, while additional analysis could be offloaded to a cloud service. Alternatively, all analysis could be local.

In some cases, there are multiple data elements in a social media platform that are not controlled by any setting provided by the platform. These data elements may be scored based on the exposure limits described above.

In block 416, the system calculates the score. For example, the weighted score for exposure for each datatype may be represented as $WE_1$–$WE_n$.

The proactive privacy exposure score can then be represented simply by $\Sigma_{i=1}^{n}(WD_i * WE_i)$.

This assessment score can be normalized to be presented to the user in a meaningful and easily digestible way. For example, the score could be presented as a percentage, a decimal, or some other factor. The proactive privacy assessment score quantitatively represents the risk associated with the user's privacy if she continues to use the social media platform with the current configuration. This score can be used to guide the user to configure her privacy settings to better protect herself. This may include providing the user with hints or suggestions for how to improve her security posture.

In block 490, the method is done.

Figure 5:
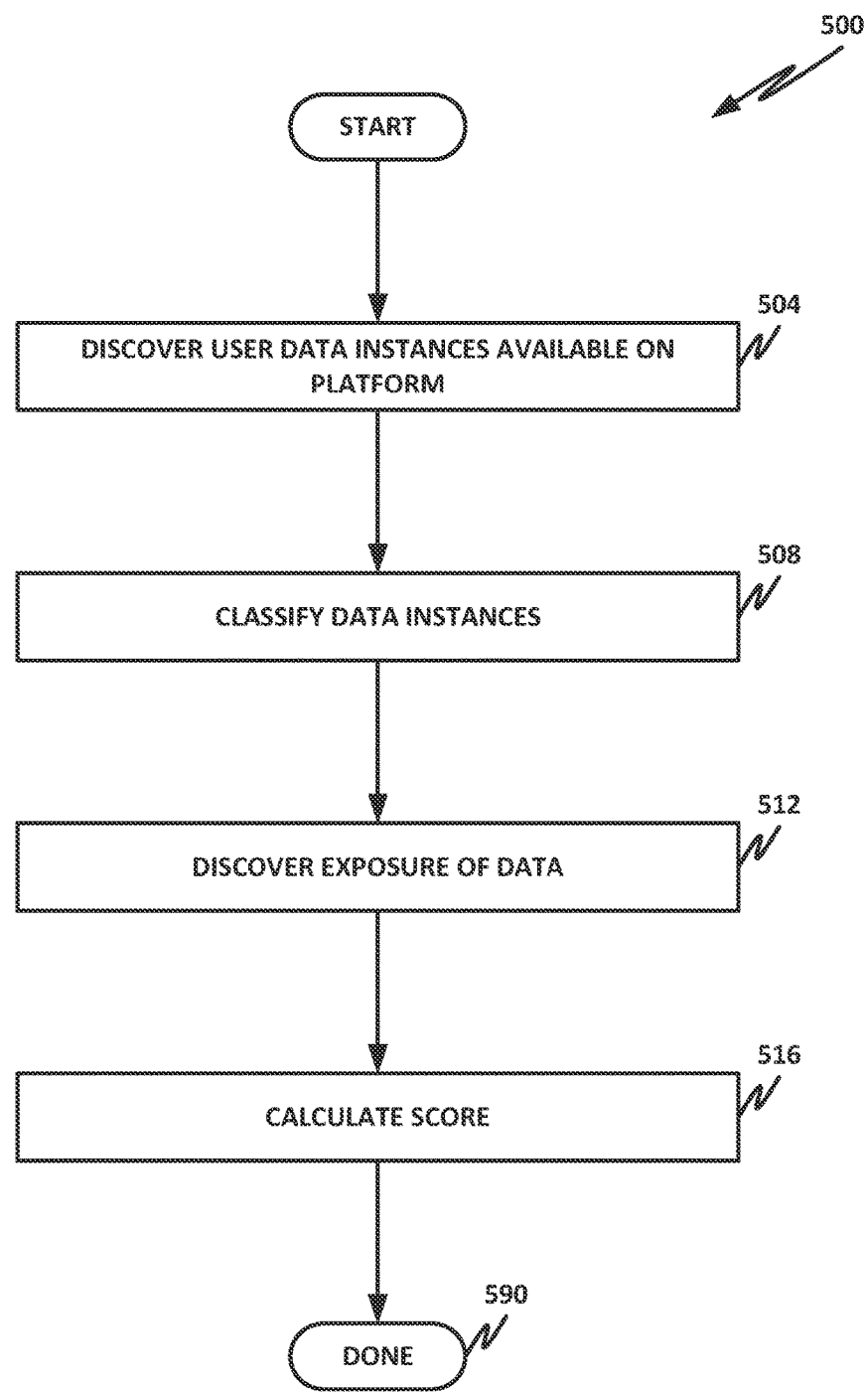
FIG. 5 is a flow chart of a method of performing reactive privacy assessment.

FIG. 5 is a flowchart of a method 500 of providing reactive privacy assessment. Reactive privacy assessment includes evaluation of the risks to privacy that the user already has. This may be derived from data the user has already shared on the given social media platform, the sensitivity of the data, the exposure of the data, and the number of people that it can reach. Because this is an ex post facto evaluation, the assessment changes as the user continues interacting with the social media platform. Thus, it may be necessary to continuously or periodically update the reactive privacy assessment. This assessment can help the user cleanup his historical data or better secure his historical data that he has already shared via the social media platform.

In block 504, the system discovers data instances available on the social media platform. This is similar to the first operation and proactive assessment, except, here, the user's data instances are scanned. Some data types can have a single data instance associated with them, such as a name or an email address. But other datatypes, like photos, post, comments, and likes can have many instances associated with them.

Discovery of the user's data instances may be done by automated collection scripts, which target a single data type for a given user. These may be provided, for example, via a plug-in to a web browser or via a security agent that interacts with dedicated apps that the user accesses to access social media platforms. The data collection can be done using various techniques like scraping by web browser extension, a cloud-based browser, the use of published APIs, or similar.

In block 508, the data are classified.

Once data instances are discovered, the classifications illustrated in the proactive assessment may be insufficient to evaluate the privacy risk associated with individual data instances. For example, a user may have posted his credit card details in a comment. Even though the data element is public by nature (e.g., comments are not generally considered private), this particular data instance is highly private to the user. Thus, although the categorization mentioned in relation to proactive assessment may still apply to the datatype as a whole, a specific data instance may be further classified into the following categories using techniques like natural language processing, image classification, or similar.

| Nature | Example types of information exposed by the platform | Intrinsic privacy value (indicative) |
|---|---|---|
| PII (Personally Identifiable Information) | Any data which can be used for personal identification (email, social security etc.) | 100 |
| Derived PII | Any data which can be used to derive PII (current location, workplace etc.) | 90 |
| Financial | Any data related directly or indirectly to user's finance (credits, card numbers etc.) | 80 |
| Inappropriate | Any data which can be deemed inappropriate (racial, religiously offensive etc.) | 60 |
| Personal | Any data which can be deemed personal (intimate photographs, posts etc.) | 40 |
| Demographic | Any data which can be used to classify user into a certain demography (political opinion, ethnicity etc.) | 20 |
| Normal | Data which cannot be directly or indirectly used to impact user's privacy | 0 |

In this example, M is the number of data instances of a user on a social media platform for a specific data type. The score for each data instance may be represented as $DI_1$–$DI_m$.

In block 512, the system may discover the exposure of all the user's data instances available on the social media platform. This is similar to the proactive assessment, but instead of checking the platform's setting configuration, each data instance's individual configuration may be evaluated to give it a particular weight. Each data instance discovered may, along with the exposure based on configuration, provide a risk associated with that data instance. Here, the degree of connectivity may be taken into consideration. For example, the risk associated with a private photograph shared with friends depends on the number of friends a person has, while the risk associated with the same photograph shared with the public may be much higher. Each user's degree of connectivity may be calculated by scraping through her friends list and also scraping through her friends' friends lists.

The higher the connectivity a user has for a particular data instance, the more exposed her data may be by that data instance. Thus, a data instance's configuration and degree of connectivity may be used in tandem to provide a weight to the exposure of the given data instance.

| Exposure of a data entity based on configuration and connectivity | Description | Weightage for Privacy management (indicative) |
| --- | --- | --- |
| Only Me (0) | If based on configuration the data entity is visible to only me. | 0 |
| >0 and <= 100 | If based on configuration the data entity is visible to less than 100 friends or friends of friends. | .2 |
| >100 and <= 200 | If based on configuration the data entity is visible to less than 200 friends or friends of friends. | .4 |
| >200 and <= 500 | If based on configuration the data entity is visible to less than 500 friends or friends of friends. | .6 |
| >500 and <= 1000 | If based on configuration the data entity is visible to less than 1000 friends or friends of friends. | .8 |
| >1000 or public | If based on configuration the data entity is visible to more than a 1000 people or everyone. | 1 |

Here, the score for exposure for each data instance may be represented as $EI_1$–$EI_m$.

In block 516, the score for exposure may be calculated. The reactive privacy assessment quantitative score may be the sum of each data element represented by $SI_j = \Sigma_{i=1}^{m}(DI_i * EI_i)$. The total reactive privacy exposure score can be represented as: $\Sigma_{j=1}^{n}(SI_j)$.

As with the proactive score, the reactive score may be normalized to be presented to the user in a meaningful or easily digestible way. The reactive privacy assessment score represents the risk associated with the user's privacy based on all the previous data that she has already shared. This score can be used to guide the user and deleting older data, or limiting the visibility of her data, to better protect yourself and provide a better security posture.

In block 590, the method is done.

Figure 6:
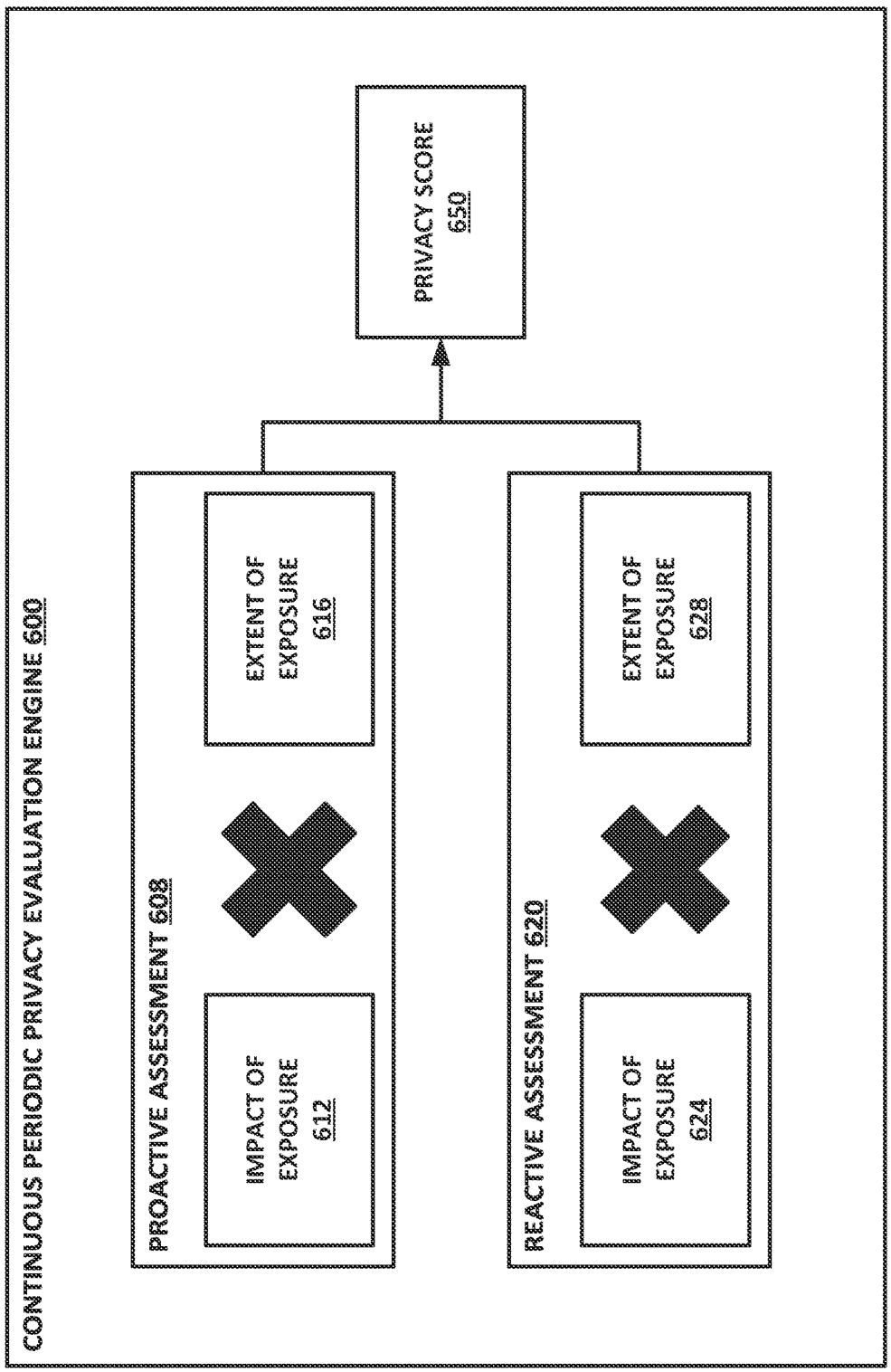
FIG. 6 is a block diagram of a continuous periodic evaluation model.

FIG. 6 is a block diagram providing an illustrative continuous periodic privacy evaluation engine 600. Continuous periodic privacy evaluation engine 600 may be located on a single device or certain elements may be spread across different devices, such as between mobile devices, desktop devices, and/or cloud services.

Continuous periodic privacy evaluation engine 600 includes a proactive assessment 608 and a reactive assessment 620.

As illustrated here in a simplified form, the proactive assessment 608 is the product of the impact of exposure 612 and the extent of exposure 616. Impact of exposure 612 may be measured according to certain datatypes, and extent of exposure 616 may be measured according to certain user settings.

Reactive assessment 620 may be a product of impact of exposure 624 and extent of exposure 628. In this case, the impact of exposure 624 may be measured according to each data instance already shared across all datatypes. The extent of exposure 628 may be measured by evaluating the reach of each respective data instance, such as according to its individual privacy settings.

The proactive assessment 608 and reactive assisted assessment 620 may be used together to provide an overall privacy posture of a user as illustrated in privacy score 650. Privacy score 650 may be specific to a particular social media platform or could also be an aggregate score across multiple social media platforms. The weight or contribution of a proactive assessment score and the overall privacy score can be derived based on how actively engaged the user has been on a given social media platform. The user's engagement on a social media platform may be derived and quantified according to his interaction with the platform.

Privacy score 650 can be used to enable the user to better understand his privacy posture on social media platforms. This can be combined with other techniques to automate or facilitate the user improving the user's social media security posture.

FIG. 7 is a block diagram of a hardware platform 700. Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 700, even though they may be scattered across a data center, or even located in different data centers.

Hardware platform 700 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 700 is arranged in a point-to-point (PtP) configuration. This PtP configuration is popular for personal computer (PC) and server-type devices, although it is not so limited, and any other bus type may be used.

Hardware platform 700 is an example of a platform that may be used to implement embodiments of the teachings of this specification. For example, instructions could be stored in storage 750. Instructions could also be transmitted to the hardware platform in an ethereal form, such as via a network interface, or retrieved from another source via any suitable interconnect. Once received (from any source), the instructions may be loaded into memory 704, and may then be executed by one or more processor 702 to provide elements such as an operating system 706, operational agents 708, or data 712.

Hardware platform 700 may include several processors 702. For simplicity and clarity, only processors PROC0 702-1 and PROC1 702-2 are shown. Additional processors (such as 2, 4, 8, 16, 24, 32, 64, or 128 processors) may be provided as necessary, while in other embodiments, only one processor may be provided. Processors may have any number of cores, such as 1, 2, 4, 8, 16, 24, 32, 64, or 128 cores.

Processors 702 may be any type of processor and may communicatively couple to chipset 716 via, for example, PtP interfaces. Chipset 716 may also exchange data with other elements, such as a high performance graphics adapter 722. In alternative embodiments, any or all of the PtP links illustrated in FIG. 7 could be implemented as any type of bus, or other configuration rather than a PtP link. In various embodiments, chipset 716 may reside on the same die or package as a processor 702 or on one or more different dies or packages. Each chipset may support any suitable number of processors 702. A chipset 716 (which may be a chipset, uncore, Northbridge, Southbridge, or other suitable logic and circuitry) may also include one or more controllers to couple other components to one or more central processor units (CPU).

Two memories, 704-1 and 704-2 are shown, connected to PROC0 702-1 and PROC1 702-2, respectively. As an example, each processor is shown connected to its memory in a direct memory access (DMA) configuration, though other memory architectures are possible, including ones in which memory 704 communicates with a processor 702 via a bus. For example, some memories may be connected via a system bus, or in a data center, memory may be accessible in a remote DMA (RDMA) configuration.

Memory 704 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 704 may be used for short, medium, and/or long-term storage. Memory 704 may store any suitable data or information utilized by platform logic. In some embodiments, memory 704 may also comprise storage for instructions that may be executed by the cores of processors 702 or other processing elements (e.g., logic resident on chipsets 716) to provide functionality.

In certain embodiments, memory 704 may comprise a relatively low-latency volatile main memory, while storage 750 may comprise a relatively higher-latency nonvolatile memory. However, memory 704 and storage 750 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 704 and storage 750, for example, in a single physical memory device, and in other cases, memory 704 and/or storage 750 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 722 may be configured to provide a human-readable visual output, such as a command-line interface (CLI) or graphical desktop such as Microsoft Windows, Apple OSX desktop, or a Unix/Linux X Window System-based desktop. Graphics adapter 722 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 722 may include a hardware graphics card, which may have its own memory and its own graphics processing unit (GPU).

Chipset 716 may be in communication with a bus 728 via an interface circuit. Bus 728 may have one or more devices that communicate over it, such as a bus bridge 732, I/O devices 735, accelerators 746, communication devices 740, and a keyboard and/or mouse 738, by way of nonlimiting example. In general terms, the elements of hardware platform 700 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 740 can broadly include any communication not covered by a network interface and the various I/O devices described herein. This may include, for example, various universal serial bus (USB), FireWire, Lightning, or other serial or parallel devices that provide communications.

I/O Devices 735 may be configured to interface with any auxiliary device that connects to hardware platform 700 but that is not necessarily a part of the core architecture of hardware platform 700. A peripheral may be operable to provide extended functionality to hardware platform 700, and may or may not be wholly dependent on hardware platform 700. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 742 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 732 may be in communication with other devices such as a keyboard/mouse 738 (or other input devices such as a touch screen, trackball, etc.), communication devices 740 (such as modems, network interface devices, peripheral interfaces such as PCI or PCIe, or other types of communication devices that may communicate through a network), audio I/O 742, a data storage device 744, and/or accelerators 746. In alternative embodiments, any portions of the bus architectures could be implemented with one or more PtP links.

Operating system 706 may be, for example, Microsoft Windows, Linux, UNIX, Mac OS X, iOS, MS-DOS, or an embedded or real-time operating system (including embedded or real-time flavors of the foregoing). In some embodiments, a hardware platform 700 may function as a host platform for one or more guest systems that invoke application (e.g., operational agents 708).

Operational agents 708 may include one or more computing engines that may include one or more nontransitory computer-readable mediums having stored thereon executable instructions operable to instruct a processor to provide operational functions. At an appropriate time, such as upon booting hardware platform 700 or upon a command from operating system 706 or a user or security administrator, a processor 702 may retrieve a copy of the operational agent (or software portions thereof) from storage 750 and load it into memory 704. Processor 702 may then iteratively execute the instructions of operational agents 708 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

In some cases, the function of an engine is described in terms of a "circuit" or "circuitry to" perform a particular function. The terms "circuit" and "circuitry" should be understood to include both the physical circuit, and in the case of a programmable circuit, any instructions or data used to program or configure the circuit.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 700 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fiber Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 700 may be virtualized, in particular the processor(s) and memory. For example, a virtualized environment may run on OS 706, or OS 706 could be replaced with a hypervisor or virtual machine manager. In this configuration, a virtual machine running on hardware platform 700 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 7 may be combined in a SoC architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 8. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

FIG. 8 is a block illustrating selected elements of an example SoC 800. At least some of the teachings of the present specification may be embodied on an SoC 800, or may be paired with an SoC 800. SoC 800 may include, or may be paired with, an advanced reduced instruction set computer machine (ARM) component. For example, SoC 800 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 800 could also be integrated into, for example, a PC, server, video processing components, laptop computer, notebook computer, netbook, or touch-enabled device.

As with hardware platform 700 above, SoC 800 may include multiple cores 802-1 and 802-2. In this illustrative example, SoC 800 also includes an L2 cache control 804, a GPU 806, a video codec 808, a liquid crystal display (LCD) I/F 810 and an interconnect 812. L2 cache control 804 can include a bus interface unit 814, a L2 cache 816. Liquid crystal display (LCD) I/F 810 may be associated with mobile industry processor interface (MIPI)/HDMI links that couple to an LCD.

SoC 800 may also include a subscriber identity module (SIM) I/F 818, a boot ROM 820, a synchronous dynamic random access memory (SDRAM) controller 822, a flash controller 824, a serial peripheral interface (SPI) director 828, a suitable power control 830, a dynamic RAM (DRAM) 832, and flash 834. In addition, one or more embodiments include one or more communication capabilities, interfaces, and features such as instances of Bluetooth, a 3G modem, a global positioning system (GPS), and an 802.11 Wi-Fi.

Designers of integrated circuits such as SoC 800 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 9 is a block diagram of a NFV infrastructure 900. NFV is an example of virtualization, and the virtualization infrastructure here can also be used to realize traditional virtual machines (VMs). NFV is generally considered distinct from software defined networking (SDN), but they can interoperate together, and the teachings of this specification should also be understood to apply to SDN in appropriate circumstances. For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be VMs). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 900. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 9, an NFV orchestrator 901 manages a number of the VNFs 912 running on an NFVI 900. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 901 a valuable system resource. Note that NFV orchestrator 901 may provide a browser-based or graphical configuration interface, and in some embodiments may be integrated with SDN orchestration functions.

Note that NFV orchestrator 901 itself may be virtualized (rather than a special-purpose hardware appliance). NFV orchestrator 901 may be integrated within an existing SDN system, wherein an operations support system (OSS) manages the SDN. This may interact with cloud resource management systems (e.g., OpenStack) to provide NFV orchestration. An NFVI 900 may include the hardware, software, and other infrastructure to enable VNFs to run. This may include a hardware platform 902 on which one or more VMs 904 may run. For example, hardware platform 902-1 in this example runs VMs 904-1 and 904-2. Hardware platform 902-2 runs VMs 904-3 and 904-4. Each hardware platform 902 may include a respective hypervisor 920, virtual machine manager (VMM), or similar function, which may include and run on a native (bare metal) operating system, which may be minimal so as to consume very few resources. For example, hardware platform 902-1 has hypervisor 920-1, and hardware platform 902-2 has hypervisor 920-2.

Hardware platforms 902 may be or comprise a rack or several racks of blade or slot servers (including, e.g., processors, memory, and storage), one or more data centers, other hardware resources distributed across one or more geographic locations, hardware switches, or network interfaces. An NFVI 900 may also include the software architecture that enables hypervisors to run and be managed by NFV orchestrator 901.

Running on NFVI 900 are a number of VMs 904, each of which in this example is a VNF providing a virtual service appliance. Each VM 904 in this example includes an instance of the Data Plane Development Kit (DPDK) 916, a virtual operating system 908, and an application providing the VNF 912. For example, VM 904-1 has virtual OS 908-1, DPDK 916-1, and VNF 912-1. VM 904-2 has virtual OS 908-2, DPDK 916-2, and VNF 912-2. VM 904-3 has virtual OS 908-3, DPDK 916-3, and VNF 912-3. VM 904-4 has virtual OS 908-4, DPDK 916-4, and VNF 912-4.

Virtualized network functions could include, as nonlimiting and illustrative examples, firewalls, intrusion detection systems, load balancers, routers, session border controllers, DPI services, network address translation (NAT) modules, or call security association.

The illustration of FIG. 9 shows that a number of VNFs 904 have been provisioned and exist within NFVI 900. This FIGURE does not necessarily illustrate any relationship between the VNFs and the larger network, or the packet flows that NFVI 900 may employ.

The illustrated DPDK instances 916 provide a set of highly-optimized libraries for communicating across a virtual switch (vSwitch) 922. Like VMs 904, vSwitch 922 is provisioned and allocated by a hypervisor 920. The hypervisor uses a network interface to connect the hardware platform to the data center fabric (e.g., a host fabric interface (HFI)). This HFI may be shared by all VMs 904 running on a hardware platform 902. Thus, a vSwitch may be allocated to switch traffic between VMs 904. The vSwitch may be a pure software vSwitch (e.g., a shared memory vSwitch), which may be optimized so that data are not moved between memory locations, but rather, the data may stay in one place, and pointers may be passed between VMs 904 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 922 is illustrated, wherein vSwitch 922 is shared between two or more physical hardware platforms 902.

FIG. 10 is a block diagram of selected elements of a containerization infrastructure 1000. Like virtualization, containerization is a popular form of providing a guest infrastructure.

Containerization infrastructure 1000 runs on a hardware platform such as containerized server 1004. Containerized server 1004 may provide a number of processors, memory, one or more network interfaces, accelerators, and/or other hardware resources.

Running on containerized server 1004 is a shared kernel 1008. One distinction between containerization and virtualization is that containers run on a common kernel with the main operating system and with each other. In contrast, in virtualization, the processor and other hardware resources are abstracted or virtualized, and each virtual machine provides its own kernel on the virtualized hardware.

Running on shared kernel 1008 is main operating system 1012. Commonly, main operating system 1012 is a Unix or Linux-based operating system, although containerization infrastructure is also available for other types of systems, including Microsoft Windows systems and Macintosh systems. Running on top of main operating system 1012 is a containerization layer 1016. For example, Docker is a popular containerization layer that runs on a number of operating systems, and relies on the Docker daemon. Newer operating systems (including Fedora Linux 32 and later) that use version 2 of the kernel control groups service (cgroups v2) feature appear to be incompatible with the Docker daemon. Thus, these systems may run with an alternative known as Podman that provides a containerization layer without a daemon.

Various factions debate the advantages and/or disadvantages of using a daemon-based containerization layer versus one without a daemon, like Podman. Such debates are outside the scope of the present specification, and when the present specification speaks of containerization, it is intended to include containerization layers, whether or not they require the use of a daemon.

Main operating system 1012 may also include a number of services 1018, which provide services and interprocess communication to userspace applications 1020.

Services 1018 and userspace applications 1020 in this illustration are independent of any container.

As discussed above, a difference between containerization and virtualization is that containerization relies on a shared kernel. However, to maintain virtualization-like segregation, containers do not share interprocess communications, services, or many other resources. Some sharing of resources between containers can be approximated by permitting containers to map their internal file systems to a common mount point on the external file system. Because containers have a shared kernel with the main operating system 1012, they inherit the same file and resource access permissions as those provided by shared kernel 1008. For example, one popular application for containers is to run a plurality of web servers on the same physical hardware. The Docker daemon provides a shared socket, docker.sock, that is accessible by containers running under the same Docker daemon. Thus, one container can be configured to provide only a reverse proxy for mapping hypertext transfer protocol (HTTP) and hypertext transfer protocol secure (HTTPS) requests to various containers. This reverse proxy container can listen on docker.sock for newly spun up containers. When a container spins up that meets certain criteria, such as by specifying a listening port and/or virtual host, the reverse proxy can map HTTP or HTTPS requests to the specified virtual host to the designated virtual port. Thus, only the reverse proxy host may listen on ports 80 and 443, and any request to subdomain1.example.com may be directed to a virtual port on a first container, while requests to subdomain2.example.com may be directed to a virtual port on a second container.

Other than this limited sharing of files or resources, which generally is explicitly configured by an administrator of containerized server 1004, the containers themselves are completely isolated from one another. However, because they share the same kernel, it is relatively easier to dynamically allocate compute resources such as CPU time and memory to the various containers. Furthermore, it is common practice to provide only a minimum set of services on a specific container, and the container does not need to include a full bootstrap loader because it shares the kernel with a containerization host (i.e. containerized server 1004).

Thus, "spinning up" a container is often relatively faster than spinning up a new virtual machine that provides a similar service. Furthermore, a containerization host does not need to virtualize hardware resources, so containers access those resources natively and directly. While this provides some theoretical advantages over virtualization, modern hypervisors—especially type 1, or "bare metal," hypervisors—provide such near-native performance that this advantage may not always be realized.

In this example, containerized server 1004 hosts two containers, namely container 1030 and container 1040.

Container 1030 may include a minimal operating system 1032 that runs on top of shared kernel 1008. Note that a minimal operating system is provided as an illustrative example, and is not mandatory. In fact, container 1030 may perform as full an operating system as is necessary or desirable. Minimal operating system 1032 is used here as an example simply to illustrate that in common practice, the minimal operating system necessary to support the function of the container (which in common practice, is a single or monolithic function) is provided.

On top of minimal operating system 1032, container 1030 may provide one or more services 1034. Finally, on top of services 1034, container 1030 may also provide a number of userspace applications 1036, as necessary.

Container 1040 may include a minimal operating system 1042 that runs on top of shared kernel 1008. Note that a minimal operating system is provided as an illustrative example, and is not mandatory. In fact, container 1040 may perform as full an operating system as is necessary or desirable. Minimal operating system 1042 is used here as an example simply to illustrate that in common practice, the minimal operating system necessary to support the function of the container (which in common practice, is a single or monolithic function) is provided.

On top of minimal operating system 1042, container 1040 may provide one or more services 1044. Finally, on top of services 1044, container 1040 may also provide a number of userspace applications 1046, as necessary.

Using containerization layer 1016, containerized server 1004 may run a number of discrete containers, each one providing the minimal operating system and/or services necessary to provide a particular function. For example, containerized server 1004 could include a mail server, a web server, a secure shell server, a file server, a weblog, cron services, a database server, and many other types of services.

In theory, these could all be provided in a single container, but security and modularity advantages are realized by providing each of these discrete functions in a discrete container with its own minimal operating system necessary to provide those services.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a nonvolatile memory. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, nontransitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, nontransitory computer-readable storage media having stored thereon executable instructions that, when executed, cause a hardware platform or other computing system, to carry out a method or procedure. For example, the instructions could be executable object code, including software instructions executable by a processor. The one or more tangible, nontransitory computer-readable storage media could include, by way of illustrative and nonlimiting example, a magnetic media (e.g., hard drive), a flash memory, a ROM, optical media (e.g., CD, DVD, Blu-Ray), nonvolatile random access memory (NVRAM), nonvolatile memory (NVM) (e.g., Intel 3D Xpoint), or other nontransitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. A computing apparatus, comprising:
   a hardware platform comprising a processor circuit and a memory; and
   instructions encoded within the memory to instruct the processor to:
   on behalf of a human user, scan a social media platform for which the user has an account, and compute a proactive privacy risk score for the social media platform, wherein the proactive privacy risk score is a quantitative value based at least in part on an inherent risk of using the social media platform according to a plurality data types that may be collected and exposed by the social media platform, and further based at least in part on available privacy settings for the social media platform in relation to the data types;
   classify the data types into respective data classes having quantitative privacy scores associated therewith, wherein the quantitative privacy scores are based on privacy levels of the data types, wherein the privacy levels include quantitative privacy values for a class of private by nature, a class of private by choice, a class of public by choice, and a class of public by nature;
   based on the classifying, compute the proactive privacy risk score for the social media platform based on the quantitative privacy scores, wherein the platform privacy score has more than six quanta of resolution; and
   based on the proactive privacy risk score, recommend or initiate an action to improve the proactive privacy risk score.

2. The computing apparatus of claim 1, wherein the proactive privacy risk score is a weighted average of risk assessments for the data types.

3. The computing apparatus of claim 1, wherein the instructions are further to assign weights to the data classes, and weight the data types according to weights of their associated data classes.

4. The computing apparatus of claim 1, wherein the instructions are to weight the data types according to size and/or scope of audience for the data types.

5. The computing apparatus of claim 1, wherein the privacy settings include settings for whether data types are private to the user, may be shared with a subset of users of the social media platform, may be viewed by all users of the social media platform, or are publicly searchable by search engines.

6. The computing apparatus of claim 1, wherein the instructions are to assign weights to data types according to whether options associated with the data types are enabled or disabled.

7. The computing apparatus of claim 1, wherein the instructions are to add a penalty weight to at least some data types for which an opt out is not available.

8. The computing apparatus of claim 1, wherein the quantitative value has a resolution of at least 100 quantum values.

9. The computing apparatus of claim 1, wherein the instruction are further to compute a quantitative reactive privacy risk score, wherein the quantitative reactive privacy risk score accounts for data instances of the data types that the user has already provided to the social media platform.

10. One or more tangible, nontransitory computer-readable storage media having stored thereon executable instructions to instruct a processor circuit to:
    on behalf of a human user, scan a social media platform for which the human user has an account, and compute a proactive privacy risk score for the social media platform, wherein the proactive privacy risk score is a quantitative value based at least in part on an inherent risk of using the social media platform according to a plurality data types that may be collected and exposed by the social media platform, and further based at least in part on available privacy settings for the social media platform in relation to the data types;
    classify the data types into respective data classes having quantitative privacy scores associated therewith, wherein the quantitative privacy scores are based on privacy levels of the data types, wherein the privacy levels include quantitative privacy values for a class of private by nature, a class of private by choice, a class of public by choice, and a class of public by nature;
    based on the classifying, compute the proactive privacy risk score for the social media platform based on the quantitative privacy scores, wherein the proactive privacy risk score has more than six quanta of resolution; and based on the proactive privacy risk score, recommend or initiate an action to improve the proactive privacy risk score.

11. The one or more tangible, nontransitory computer-readable storage media of claim 10, wherein the proactive privacy risk score is a weighted average of risk assessments for the data types.

12. The one or more tangible, nontransitory computer-readable storage media of claim 10, wherein the instructions are further to assign weights to the data classes, and weight the data types according to weights of their associated data classes.

13. The one or more tangible, nontransitory computer-readable storage media of claim 10, wherein the instructions are to weight the data types according to size and/or scope of audience for the data types.

14. The one or more tangible, nontransitory computer-readable storage media of claim 10, wherein the privacy settings include settings for whether data types are private to the human user, may be shared with a subset of users of the social media platform, may be viewed by all users of the social media platform, or are publicly searchable by search engines.

15. The one or more tangible, nontransitory computer-readable storage media of claim 10, wherein the instructions are to assign weights to data types according to whether options associated with the data types are enabled or disabled.

16. The one or more tangible, nontransitory computer-readable storage media of claim 10, wherein the instructions are to add a penalty weight to at least some data types for which an opt out is not available.

17. The one or more tangible, nontransitory computer-readable storage media of claim 10, wherein the quantitative value has a resolution of at least 100 quantum values.

18. The one or more tangible, nontransitory computer-readable storage media of claim 10, wherein the instruction are further to compute a quantitative reactive privacy risk score, wherein the quantitative reactive privacy risk score accounts for data instances of the data types that the human user has already provided to the social media platform.

19. A computer-implemented method of assessing risk for a human user, comprising:
- on behalf of the human user, scanning a social media platform for which the human user has an account, and compute a proactive privacy risk score for the social media platform, wherein the proactive privacy risk score is a quantitative value based at least in part on an inherent risk of using the social media platform according to a plurality data types that may be collected and exposed by the social media platform, and further based at least in part on available privacy settings for the social media platform in relation to the data types;
- classifying the data types into respective data classes having quantitative privacy scores associated therewith, wherein the quantitative privacy scores are based on privacy levels of the data types, wherein the privacy levels include quantitative privacy values for a class of private by nature, a class of private by choice, a class of public by choice, and a class of public by nature;
- based on the classifying, computing the proactive privacy risk score for the social media platform based on the quantitative privacy scores, wherein the proactive privacy risk score has more than six quanta of resolution; and
- based on the proactive privacy risk score, recommending or initiate an action to improve the proactive privacy risk score.

20. The computer-implemented method of claim 19, wherein the proactive privacy risk score is a weighted average of risk assessments for the data types.

\* \* \* \* \*